Dec. 5, 1939.   J. CLARK   2,182,068
APPARATUS FOR COATING FOOD PRODUCTS
Filed Sept. 11, 1937   4 Sheets-Sheet 1
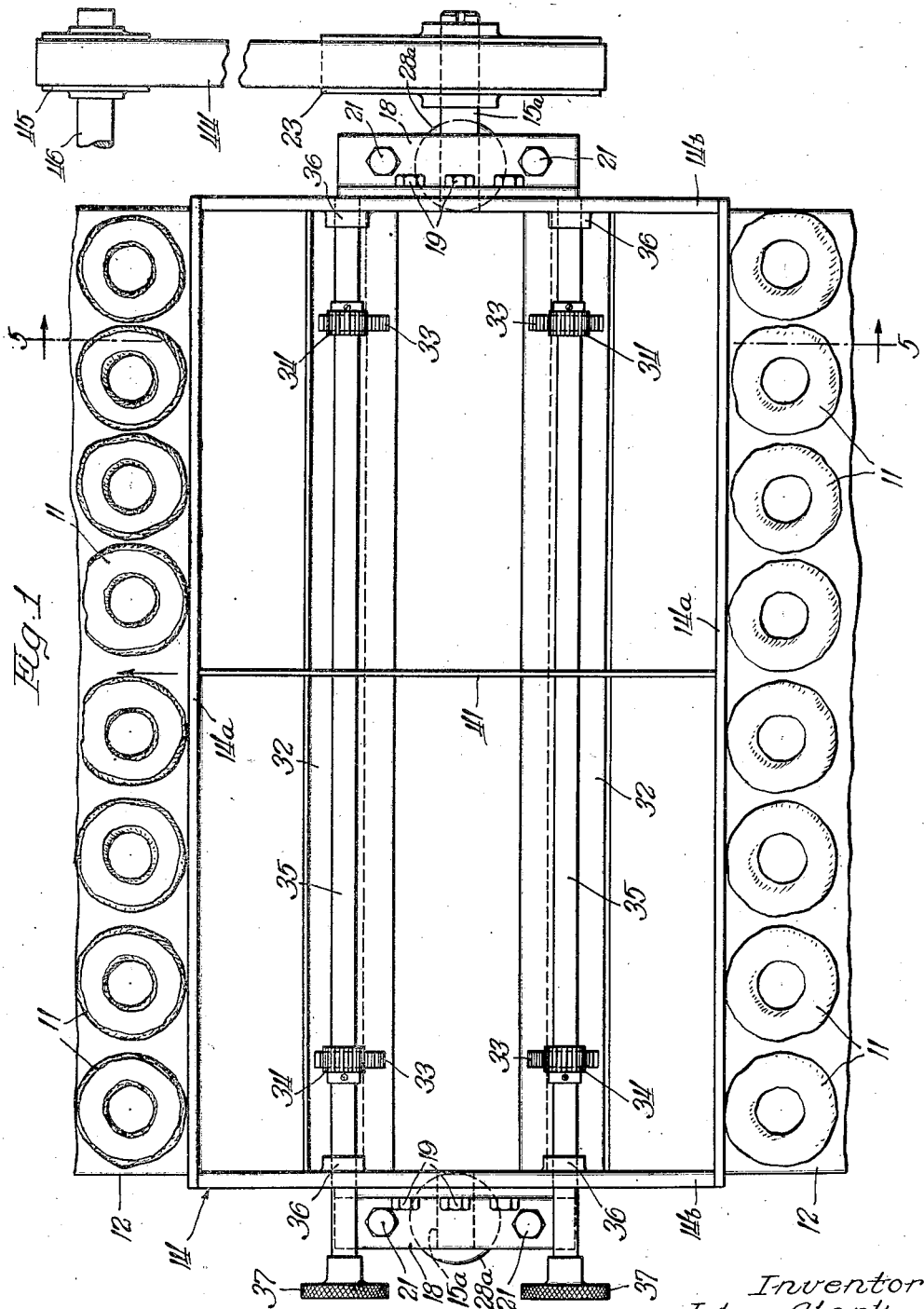
Inventor:
John Clark
By: [signature]
Att'ys

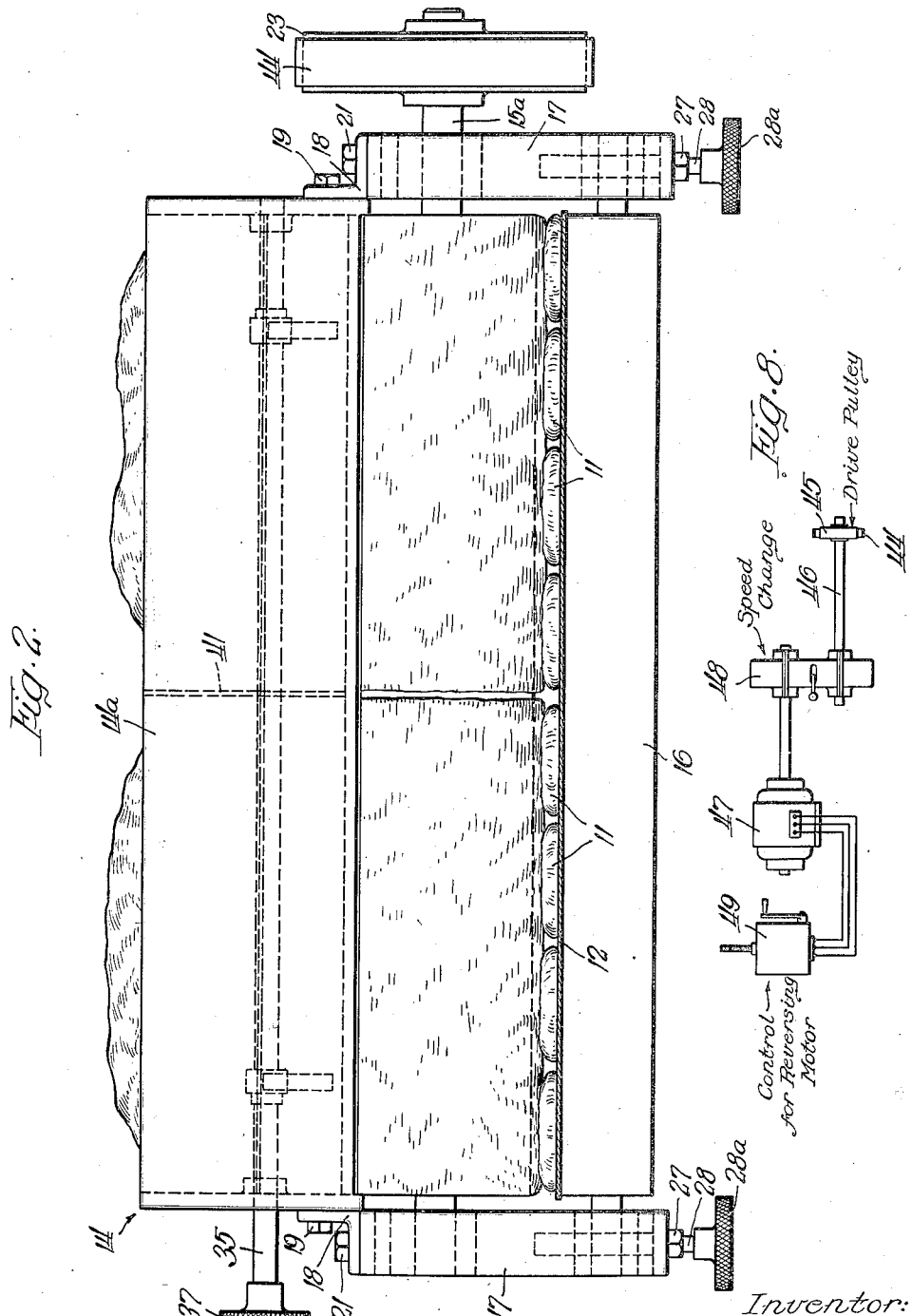

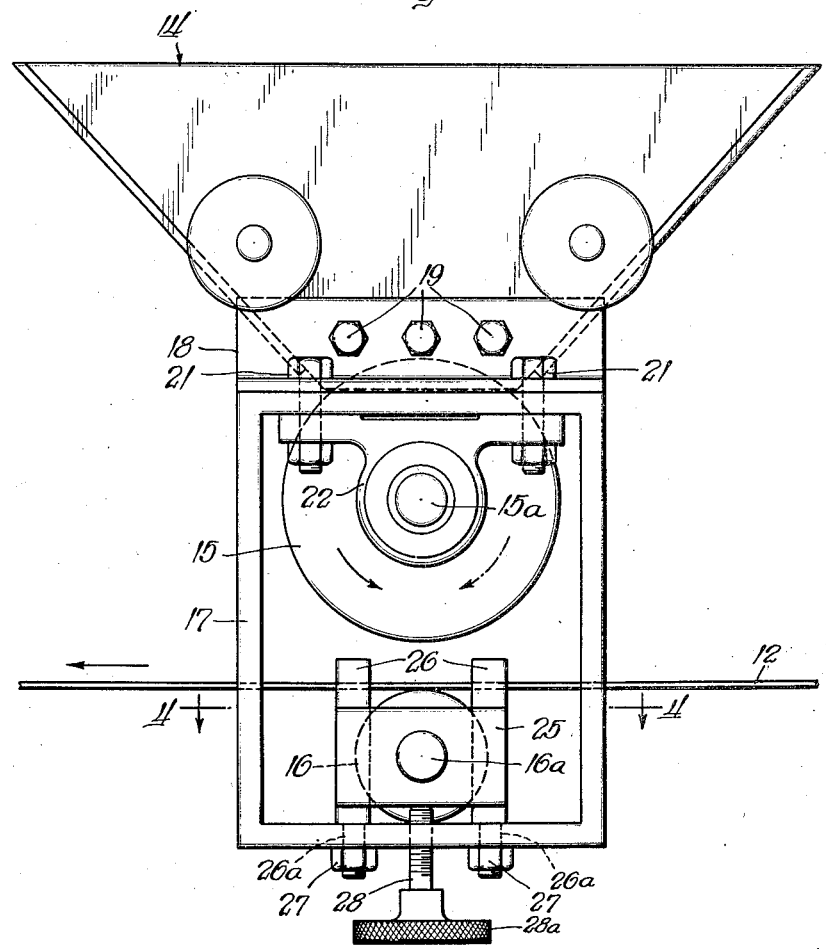

Inventor:
John Clark

Patented Dec. 5, 1939

2,182,068

UNITED STATES PATENT OFFICE 2,182,068

APPARATUS FOR COATING FOOD PRODUCTS

John Clark, Chicago, Ill., assignor to Consolidated Biscuit Company, Chicago, Ill., a corporation of Illinois Application September 11, 1937, Serial No. 163,432

9 Claims. (Cl. 91—2)

The present invention relates to apparatus for coating food products. The principal field of utility for which my improved apparatus has been devised is the application of icing or frosting to cookies, cakes, doughnuts, and the like. However, the apparatus can also be employed in other related fields of utility, such as for the coating of candies and the like.

One of the objects of the invention is to provide improved coating or feeding means which conducts the coating material from a supply hopper and applies it to the food products as they travel on an endless conveyor below the hopper. This coating means is preferably in the form of a sponge rubber roll to which the coating material readily adheres so that it can be rapidly conducted from the supply hopper and applied to the food products. The exceptionally high degree of elasticity of the sponge rubber roll also accommodates wide variations in the thickness of any one run of cookies, cakes, doughnuts and the like, so that a uniform application of the coating material is made, irrespective of relatively large variations in the thickness of the food products traveling on the conveyor. Furthermore, the high elasticity of the sponge rubber roll prevents any of the food products from being broken or crushed in the application of the icing or frosting.

Another object of the invention is to provide improved means for adjusting the spacing between the sponger rubber coating roll and the endless conveyor on which the food products are conveyed beneath said roll. This spacing adjustment readily adapts the apparatus to the coating of food products of widely different sizes.

Another object of the invention is to provide improved means for governing the thickness of the layer of coating material conveyed on the coating roll from the hopper to the food products.

Another object of the invention is to provide improved apparatus of the class described, in which the coating roll can be driven in either direction and at any desired speed.

Other objects and advantages of the invention will appear from the following detailed description of one preferred embodiment thereof. In the accompanying drawings illustrating such embodiment:

Figure 1 is a plan view of my improved apparatus;

Figure 2 is a side elevational view thereof;

Figure 3 is an end elevational view of the apparatus;

Figure 4 is a horizontal detail sectional view taken approximately on the line 4—4 of Figure 3;

Figure 8 is a diagrammatic view illustrating the apparatus for reversing the direction of rotation of the coating roll and for changing the speed of rotation of said roll.

Figure 5:
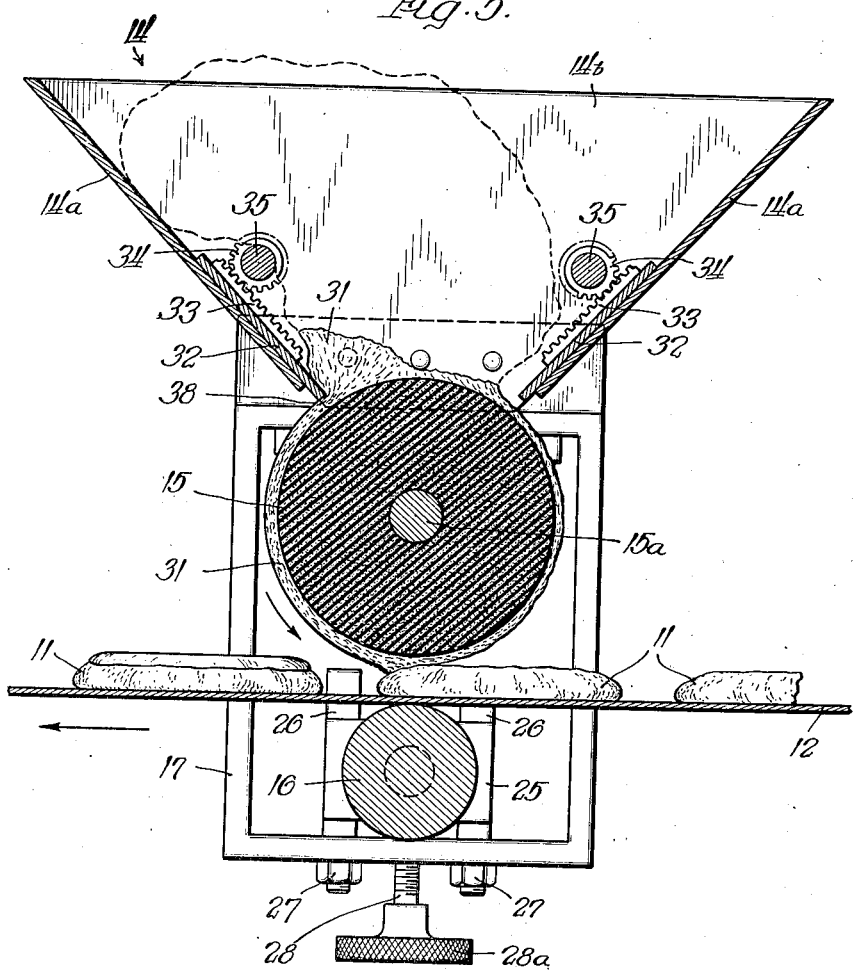
Figure 5 is a transverse sectional view through the apparatus, taken approximately in the plane of line 5—5 of Figure 1.
Figure 7:
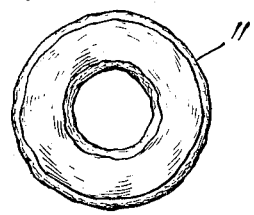
Figures 6 and 7 illustrate a typical cookie or doughnut before and after the application of the icing thereto.
Figure 6:
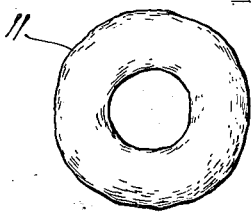

The food products, indicated at 11, are conveyed to my improved coating apparatus by any suitable conveying device, preferably, however, by an endless belt indicated at 12. In the case of cookies, cakes, and other baked commodities the endless belt can extend directly from the baking oven and, in the case of doughnuts, it can extend from a point near the receptacle in which the doughnuts are dipped.

In the main, my improved coating apparatus comprises a V-shaped hopper 14 for containing the coating material, a coating roll 15 for conducting the coating material from the hopper to the food commodity, and a supporting roller 16 over which the endless belt 12 travels in conveying the food products 11 past the coating roll 15. The hopper 14 comprises the sloping side walls 14a and the end wall 14b. The coating roll 15 and the supporting roll 16 are journaled in rectangular end frames 17 which have bolted attachment to the ends of the hopper 14 through angle brackets 18. The upwardly extending flanges of said angle brackets 18 are secured to the end walls 14b of the hopper by cap screws or bolts 19, and the horizontally extending flanges of said brackets are secured to the rectangular frames 17 by bolts 21. The bolts 21 also pass through the base portions of bearing brackets 22 for rigidly mounting the latter in the end frames 17. These brackets afford bearing support for the shaft 15a of the coating roll 15. Power is transmitted to said shaft through a pulley 23 mounted on one end of said shaft (Figure 1).

The belt supporting roller 16 has stub shafts 16a projecting from its ends and which are journaled in bearing blocks 25 adjustably supported in said end frames 17. The two bearing blocks 25 supporting opposite ends of the roller 16 are of identical construction and mounting, each being provided with rectangularly shaped guideways 25a extending vertically in the end faces of said blocks for slidable guided engagement over square guide posts 26, as shown in Figures 3 and 4. The lower ends of these guide posts have reduced threaded shanks 26a which pass down through holes in the bottom cross bar of each rectangular end frame 17 and which are rigidly clamped to said frame by nuts 27. Adjusting screws 28 provided with knurled heads 28a screw upwardly through threaded openings in the bottom cross bars of the frames 17 and abut the bottom surfaces of the slidable bearing blocks 25. It will be evident that by upward or downward adjustment of the two screws 28 at opposite ends of the apparatus, the vertical space between the belt conveyor 12 and the lower surface of the sponge rubber coating roll 15 can be adjusted as desired. Such adjustment adapts the apparatus to the coating of food products of different sizes, and also affords an adjustment which may be employed to vary the area or depth of the coating applied to the food products.

The supporting structure on which the above described coating apparatus is mounted may have attachment to the hopper 14 or to the end frames 17.

The rate of feed of the coating material 31 from the hopper 14 to the coating roll 15 is governed by gate valves 32 which are slidably mounted on the inner surfaces of the sloping side walls 14a of the hopper. The provision of one of these valves on each side wall adapts the apparatus to the rotation of the coating roll in either direction. Each valve plate is provided with two gear racks 33 secured to the plate adjacent to the ends thereof, as shown in Figure 1. Meshing with these racks are pinions 34 mounted on parallel adjusting shafts 35. Said shafts are supported in bearings 36 carried by the end walls 14b of the hopper, and each shaft extends outwardly beyond one end of the hopper for having a knurled actuating head 37 mounted thereon. Rotation of one or the other of these heads causes the corresponding gate valve 32 to be moved upwardly or downwardly for enlarging or constricting the throat area of the opening 38 through which the coating material 31 is fed to the surface of the roll 15. Thus, the thickness of the layer of coating material carried downwardly on the feeding side of the coating roll can be adjusted for applying different amounts of the material to the food products. The gate valve disposed at the upwardly moving side of the coating roll is so adjusted that it will not scrape any of the coating material moving upwardly on this side of the roll.

In some instances it may be desirable to apply icing of one color to one batch of the food products and to apply icing of another color to another batch of said products. This can be accomplished simultaneously in a single run of the same products through my improved coating apparatus, such being provided for by dividing the hopper 14 into two or more compartments through the instrumentality of one or more transverse partitions 41 (Figure 1), whereby batches of icing of different color or different composition can be placed in the different compartments. Narrow slots in the sloping lower edges of such partition or partitions accommodate the adjusting movements of the gate valves 32.

The driving mechanism for the coating roll 15 comprises a belt 44 extending from the pulley 23 to a drive pulley 45 mounted on a drive shaft 46 (Figures 1 and 8). This shaft is driven from an electric motor 47 through the instrumentality of suitable speed change mechanism 48 represented, for example, by a Reeves variable speed drive mechanism which affords a wide range of infinitely small speed graduations. Speed reduction gearing may also be included in the driving train to enable the range of the variable speed mechanism 48 to be utilized most effectively at the average speed of the coating roll. The ability to reverse the direction of rotation of the coating roll can be provided for in various ways, although I preferably employ a three-phase motor 47 and connect the latter to its power source through a reversing control box 49 which is operable to reverse the connection of two of the phases in the motor.

It will be seen from the foregoing that my improved apparatus is characterized by a wide variety of adjustments for adapting the apparatus to different types of food products and to other different operating conditions. The ability to drive the coating roll 15 at substantially any speed in either direction enables the time interval during which the coating material is being applied to the food products to be adjusted as desired for different types and conditions of food products, and different types and conditions of the coating material. As previously remarked, the coating material readily adheres to the sponge rubber roll 15, and the high elasticity of this roll prevents the food products from being broken or crushed in the application of the icing or other coating. While sponge rubber is the preferred material from which to construct this coating roll, I wish it to be understood that the invention is not necessarily limited thereto.

While I have illustrated and described what I regard to be the preferred embodiment of my invention, nevertheless it will be understood that such is merely exemplary, and that numerous modifications and rearrangements may be made therein without departing from the essence of the invention.

I claim:

1. In apparatus for coating food products and the like, the combination of a receptacle for holding the coating material, means for conveying the food products into proximity to said receptacle, and a coating roll for transferring the coating material from said receptacle to said food products, the outer surface of said roll being adapted to have direct contact with the food products and being composed of a material of relatively soft consistency capable of yieldingly conforming to the surfaces of said food products.

2. In apparatus for coating food products and the like, the combination of a hopper for holding the coating material, a conveyor for conveying the food products into proximity to said hopper, and a coating roll for transferring the coating material from said hopper to said food products by direct contact with said food products, said roll comprising an outer surface of sponge rubber capable of resiliently conforming to the surfaces of the food products in any pressure relation between said roll and said food products.

3. In apparatus for applying icing and other coating materials to food products, the combination of a hopper for holding the coating material, a conveyor for conveying the food products into proximity to said hopper, a coating roll for receiving the coating material from said hopper and applying the same to said food products, valve means for governing the quantity of coating material fed to either side of said coating roll, and means for adjusting the position of said valve means.

4. In apparatus of the class described, the combination of a hopper for holding the coating material, a conveyor belt for conveying the food products along a path below said hopper, said hopper having an open throat in the bottom thereof, a coating roll for receiving the coating material through said throat and applying it to the food products in their travel on said belt, said coating roll being adapted for rotation in either direction, two gate valves, one at each edge of said throat, said valves being operable to govern the quantity of coating material fed to either side of said coating roll for either direction of rotation of the latter, and rack and pinion mechanism for adjusting the positions of said gate valves.

5. In apparatus for coating food products and the like, the combination of a receptacle for holding the coating material, means for conveying the food products into proximity to said receptacle, a coating roll for transferring the coating material from said receptacle to said food products by direct contact with the latter, said coating roll and said receptacle being so arranged that said roll is capable of receiving the same amount of coating material from said receptacle in either direction of rotation of said roll, and means for transmitting a reversible drive to said coating roll for rotating the latter in either direction.

6. In apparatus for applying icing and other coating materials to food products, the combination of a hopper having a discharge throat for supplying the coating material, a single coating roll disposed substantially centrally in said throat whereby said hopper is capable of discharging material downwardly around either side of said roll, adjustable valve means at each side of the throat of said hopper for controlling the discharge of coating material to each side of said roll, and means for conveying the food products through a path whereby they receive the coating material directly from said roll.

7. In apparatus for applying icing and other coating materials to food products, the combination of a hopper for holding the coating material, a conveying surface for conveying the food products along a path below said hopper, the bottom of said hopper converging into an open discharge throat, and a rotary coating roll of relatively large diameter mounted with its upper peripheral portion disposed substantially within said open discharge throat, also with its horizontal diametrical dimension disposed substantially below said throat, and with its lower peripheral portion disposed in relatively close proximity to said conveying surface, said coating roll receiving the coating material directly on its own surface from said hopper and applying said material directly from its own surface to the food products traveling along said conveying surface.

8. In apparatus for applying icing and other coating materials to food products, the combination of a hopper for holding the coating material, a conveying surface for conveying the food products along a path below said hopper, the bottom of said hopper converging into an open discharge throat, a rotary coating roll of relatively large diameter mounted with its upper peripheral portion disposed in close proximate relation to said open discharge throat, said coating roll having its horizontal diametrical dimension disposed substantially below said throat, and having its lower peripheral portion disposed in relatively close proximity to said conveying surface, said coating roll receiving the coating material directly on its own surface from said hopper and applying said material directly from its own surface to the food products traveling along said conveying surface, and adjustable means for adjustably controlling the rate of discharge of the coating material from said hopper to said coating roll.

9. In apparatus for applying icing and other coating materials to food products, the combination of a hopper for holding the coating material, a conveying surface for conveying the food products along a path below said hopper, the bottom of said hopper converging into an open discharge throat, a rotary coating roll of relatively large diameter mounted with its upper peripheral portion disposed substantially within said open discharge throat, and with its horizontal diametrical dimension disposed substantially below said throat, and also with its lower peripheral portion disposed in relatively close proximity to said conveying surface, said coating roll receiving the coating material on its own surface from said hopper and applying said material by direct mechanical transference from its own surface to the food products traveling along said conveying surface, and adjusting means for effecting a relative vertical adjustment between said conveying surface and said coating roll.

JOHN CLARK.